United States Patent
Seo et al.

(10) Patent No.: US 11,433,918 B2
(45) Date of Patent: Sep. 6, 2022

(54) APPARATUS AND METHOD FOR PROVIDING NOTIFICATION OF CONTROL AUTHORITY TRANSITION IN VEHICLE

(71) Applicants: HYUNDAI MOTOR COMPANY, Seoul (KR); KIA MOTORS CORPORATION, Seoul (KR)

(72) Inventors: Min Wook Seo, Suwon-si (KR); Jin Su Jeong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/090,578

(22) Filed: Nov. 5, 2020

(65) Prior Publication Data
US 2021/0053587 A1   Feb. 25, 2021

Related U.S. Application Data

(63) Continuation of application No. 16/296,890, filed on Mar. 8, 2019, now Pat. No. 10,843,710.

(60) Provisional application No. 62/655,831, filed on Apr. 11, 2018.

(30) Foreign Application Priority Data

Dec. 7, 2018   (KR) .......................... 10-2018-0157006

(51) Int. Cl.
*B60W 50/16*   (2020.01)
*B60W 50/08*   (2020.01)
(Continued)

(52) U.S. Cl.
CPC .......... *B60W 50/16* (2013.01); *B60W 50/082* (2013.01); *G05D 1/0061* (2013.01);
(Continued)

(58) Field of Classification Search
CPC ..................... G05D 1/0061; G05D 2201/0213
See application file for complete search history.

(56) References Cited

U.S. PATENT DOCUMENTS 4,361,202 A * 11/1982 Minovitch ......... B60K 31/0058
246/167 D
5,314,037 A * 5/1994 Shaw ........................ B60T 7/22
188/DIG. 1
(Continued)

FOREIGN PATENT DOCUMENTS

DE   198 21 122 A1   6/1999
DE   101 14 187 A1   9/2002
(Continued)

OTHER PUBLICATIONS

Office Action dated Sep. 15, 2020 from the corresponding U.S. Appl. No. 16/206,170, 23 pp.
(Continued)

*Primary Examiner* — Qutbuddin Ghulamali
(74) *Attorney, Agent, or Firm* — Lempia Summerfield Katz LLC

(57) ABSTRACT

An apparatus for providing a notification of control authority transition in a vehicle is provided. The apparatus includes a speaker configured to output a sound notification, a vibration motor configured to output a vibration notification, and a control circuit configured to be electrically connected with the speaker and the vibration motor. The control circuit is configured to output a first notification using the speaker during a first time interval, when a situation to transfer control authority for the vehicle occurs, output a second notification using the speaker and the vibration motor during a second time interval, after the first time interval elapses, and output a third notification using the speaker and the vibration motor during a third time interval, after the second time interval elapses.

18 Claims, 8 Drawing Sheets

(51) Int. Cl.
  *G05D 1/00* (2006.01)
  *G08G 1/16* (2006.01)
  *G06V 20/56* (2022.01)
(52) U.S. Cl.
  CPC ......... *G05D 1/0088* (2013.01); *G06V 20/588* (2022.01); *G08G 1/167* (2013.01); *G05D 2201/0213* (2013.01)

(56) References Cited

U.S. PATENT DOCUMENTS

| | | |
|---|---|---|
| 5,521,579 A | 5/1996 | Bernhard |
| 6,055,467 A | 4/2000 | Mehring et al. |
| 6,473,678 B1 | 10/2002 | Satoh et al. |
| 6,842,687 B2 | 1/2005 | Winner et al. |
| 7,363,140 B2 | 4/2008 | Ewerhart et al. |
| 7,821,421 B2 | 10/2010 | Tamir et al. |
| 8,073,595 B2 | 12/2011 | Tabata et al. |
| 8,457,827 B1 | 6/2013 | Ferguson et al. |
| 8,521,352 B1 | 8/2013 | Ferguson et al. |
| 8,798,841 B1 | 8/2014 | Nickolaou et al. |
| 8,874,301 B1 | 10/2014 | Rao et al. |
| 9,079,571 B2 | 7/2015 | Trost et al. |
| 9,134,731 B2 | 9/2015 | Healey et al. |
| 9,315,178 B1 | 4/2016 | Ferguson et al. |
| 9,527,441 B2 | 12/2016 | Matsumura |
| 9,682,725 B2 | 6/2017 | Yamaoka |
| 9,874,871 B1 | 1/2018 | Zhu et al. |
| 10,152,883 B2 | 12/2018 | Fujimaki |
| 10,183,668 B2 | 1/2019 | Takae |
| 10,202,123 B2 | 2/2019 | Aoki |
| 10,259,459 B2 | 4/2019 | Takae |
| 10,286,907 B2 | 5/2019 | Nishiguchi et al. |
| 10,324,463 B1 | 6/2019 | Konrardy et al. |
| 10,449,856 B2 | 10/2019 | Kojima |
| 10,449,971 B2 | 10/2019 | Arakawa et al. |
| 10,451,730 B2 | 10/2019 | Talamonti et al. |
| 10,558,213 B2 | 2/2020 | Sato et al. |
| 10,618,523 B1 | 4/2020 | Fields et al. |
| 10,627,813 B2 | 4/2020 | Tsuji et al. |
| 10,663,971 B2 | 5/2020 | Sugawara et al. |
| 10,676,084 B2 | 6/2020 | Fujii |
| 10,713,952 B2 | 7/2020 | Ogawa et al. |
| 10,814,913 B2 | 10/2020 | Fujii |
| 10,935,974 B1 | 3/2021 | Fields et al. |
| 2003/0163239 A1 | 8/2003 | Winner et al. |
| 2005/0137782 A1 | 6/2005 | Shinada |
| 2005/0228588 A1 | 10/2005 | Braeuchle et al. |
| 2005/0256630 A1 | 11/2005 | Nishira et al. |
| 2006/0009910 A1 | 1/2006 | Ewerhart et al. |
| 2007/0043505 A1 | 2/2007 | Leicht |
| 2007/0255474 A1 | 11/2007 | Hayakawa et al. |
| 2008/0172153 A1 | 7/2008 | Ozaki et al. |
| 2008/0204212 A1 | 8/2008 | Jordan et al. |
| 2009/0005933 A1 | 1/2009 | Tabata et al. |
| 2009/0088925 A1 | 4/2009 | Sugawara et al. |
| 2009/0132125 A1 | 5/2009 | Yonezawa et al. |
| 2009/0171533 A1 | 7/2009 | Kataoka |
| 2009/0194350 A1 | 8/2009 | Rattapon et al. |
| 2009/0299573 A1 | 12/2009 | Thrun et al. |
| 2009/0319113 A1 | 12/2009 | Lee |
| 2010/0010733 A1 | 1/2010 | Krumm |
| 2010/0042282 A1 | 2/2010 | Taguchi et al. |
| 2010/0289632 A1 | 11/2010 | Seder et al. |
| 2011/0169625 A1 | 7/2011 | James et al. |
| 2011/0196592 A1 | 8/2011 | Kashi et al. |
| 2011/0241862 A1 | 10/2011 | Debouk et al. |
| 2011/0251758 A1 | 10/2011 | Kataoka |
| 2011/0293145 A1 | 12/2011 | Nogami et al. |
| 2012/0166032 A1 | 6/2012 | Lee et al. |
| 2012/0283907 A1 | 11/2012 | Lee et al. |
| 2012/0296522 A1 | 11/2012 | Otuka |
| 2013/0063595 A1 | 3/2013 | Niem |
| 2013/0066525 A1 | 3/2013 | Tomik et al. |
| 2013/0226406 A1 | 8/2013 | Ueda et al. |
| 2013/0253793 A1 | 9/2013 | Lee et al. |
| 2014/0074356 A1 | 3/2014 | Bone et al. |
| 2014/0309855 A1 | 10/2014 | Tran |
| 2014/0336896 A1 | 11/2014 | Udaka et al. |
| 2015/0006012 A1 | 1/2015 | Kammel et al. |
| 2015/0006013 A1 | 1/2015 | Wimmer et al. |
| 2015/0019063 A1 | 1/2015 | Lu et al. |
| 2015/0057869 A1 | 2/2015 | Healey et al. |
| 2015/0094899 A1 | 4/2015 | Hackenberg et al. |
| 2015/0148985 A1 | 5/2015 | Jo |
| 2015/0166062 A1 | 6/2015 | Johnson et al. |
| 2015/0204687 A1 | 7/2015 | Yoon et al. |
| 2015/0353082 A1 | 12/2015 | Lee et al. |
| 2015/0355641 A1 | 12/2015 | Choi et al. |
| 2015/0360721 A1 | 12/2015 | Matsuno et al. |
| 2016/0001781 A1 | 1/2016 | Fung et al. |
| 2016/0091897 A1 | 3/2016 | Nilsson et al. |
| 2016/0107682 A1 | 4/2016 | Tan et al. |
| 2016/0107687 A1 | 4/2016 | Yamaoka |
| 2016/0187879 A1 | 6/2016 | Mere et al. |
| 2016/0225261 A1 | 8/2016 | Matsumoto |
| 2016/0250968 A1 | 9/2016 | Shirakata et al. |
| 2016/0272204 A1 | 9/2016 | Takahashi et al. |
| 2016/0288707 A1 | 10/2016 | Matsumura |
| 2016/0297431 A1 | 10/2016 | Eigel et al. |
| 2016/0297447 A1 | 10/2016 | Suzuki |
| 2016/0311464 A1 | 10/2016 | Yamaoka |
| 2016/0339913 A1 | 11/2016 | Yamashita et al. |
| 2016/0349066 A1 | 12/2016 | Chung et al. |
| 2016/0368492 A1 | 12/2016 | Al-Stouhi |
| 2017/0003683 A1 | 1/2017 | Sato et al. |
| 2017/0061799 A1 | 3/2017 | Fujii et al. |
| 2017/0092125 A1 | 3/2017 | Fujimaki |
| 2017/0108865 A1 | 4/2017 | Rohde et al. |
| 2017/0124882 A1 | 5/2017 | Wang |
| 2017/0148327 A1 | 5/2017 | Sim |
| 2017/0171375 A1 | 6/2017 | Kamata |
| 2017/0183007 A1 | 6/2017 | Oh et al. |
| 2017/0197637 A1 | 7/2017 | Yamada et al. |
| 2017/0203763 A1 | 7/2017 | Yamada et al. |
| 2017/0203764 A1 | 7/2017 | Fujiki et al. |
| 2017/0225685 A1 | 8/2017 | Aoki |
| 2017/0240172 A1 | 8/2017 | Nishiguchi et al. |
| 2017/0240186 A1 | 8/2017 | Hatano |
| 2017/0243491 A1 | 8/2017 | Fujii et al. |
| 2017/0291603 A1 | 10/2017 | Nakamura |
| 2017/0308094 A1* | 10/2017 | Abe ................. G08G 1/0968 |
| 2017/0313313 A1 | 11/2017 | Asakura |
| 2017/0315556 A1 | 11/2017 | Mimura et al. |
| 2017/0334460 A1 | 11/2017 | Arakawa et al. |
| 2017/0341652 A1 | 11/2017 | Sugawara et al. |
| 2017/0341653 A1 | 11/2017 | Kubota et al. |
| 2017/0349173 A1 | 12/2017 | Nishiguchi et al. |
| 2017/0349212 A1 | 12/2017 | Oshida et al. |
| 2017/0368936 A1 | 12/2017 | Kojima |
| 2018/0009437 A1 | 1/2018 | Ooba |
| 2018/0029604 A1 | 2/2018 | Niino et al. |
| 2018/0033309 A1 | 2/2018 | Norwood |
| 2018/0037260 A1 | 2/2018 | Otake et al. |
| 2018/0043906 A1 | 2/2018 | Huang et al. |
| 2018/0046185 A1 | 2/2018 | Sato et al. |
| 2018/0050659 A1 | 2/2018 | Coburn et al. |
| 2018/0074497 A1 | 3/2018 | Tsuji et al. |
| 2018/0088574 A1 | 3/2018 | Latotzki et al. |
| 2018/0091085 A1 | 3/2018 | Tamagaki et al. |
| 2018/0111628 A1 | 4/2018 | Tamagaki et al. |
| 2018/0154939 A1 | 6/2018 | Aoki |
| 2018/0157038 A1 | 6/2018 | Kabe |
| 2018/0162416 A1 | 6/2018 | Honda et al. |
| 2018/0170370 A1 | 6/2018 | Kataoka |
| 2018/0173225 A1 | 6/2018 | Kim et al. |
| 2018/0178713 A1 | 6/2018 | Fujii |
| 2018/0178714 A1 | 6/2018 | Fujii |
| 2018/0178715 A1 | 6/2018 | Fujii |
| 2018/0178716 A1 | 6/2018 | Fujii |
| 2018/0178801 A1 | 6/2018 | Hashimoto et al. |
| 2018/0178802 A1 | 6/2018 | Miyata |
| 2018/0186376 A1 | 7/2018 | Lee et al. |
| 2018/0188735 A1 | 7/2018 | Sugawara et al. |

(56) References Cited

U.S. PATENT DOCUMENTS

| | | |
|---|---|---|
| 2018/0194280 A1 | 7/2018 | Shibata et al. |
| 2018/0197414 A1 | 7/2018 | Oooka |
| 2018/0209801 A1 | 7/2018 | Stentz et al. |
| 2018/0215387 A1 | 8/2018 | Takae |
| 2018/0215389 A1 | 8/2018 | Takae |
| 2018/0222422 A1 | 8/2018 | Takae |
| 2018/0222423 A1 | 8/2018 | Takae et al. |
| 2018/0237030 A1 | 8/2018 | Jones et al. |
| 2018/0239352 A1* | 8/2018 | Wang ............... B60W 60/0053 |
| 2018/0251155 A1 | 9/2018 | Chan |
| 2018/0257669 A1 | 9/2018 | Makke et al. |
| 2018/0281788 A1 | 10/2018 | Uchida |
| 2018/0290666 A1 | 10/2018 | Ichikawa et al. |
| 2018/0292820 A1 | 10/2018 | Marberger |
| 2018/0297638 A1 | 10/2018 | Fujii |
| 2018/0297639 A1 | 10/2018 | Fujii |
| 2018/0297640 A1 | 10/2018 | Fujii |
| 2018/0339708 A1 | 11/2018 | Geller |
| 2018/0345959 A1 | 12/2018 | Fujii |
| 2018/0345960 A1 | 12/2018 | Fujii |
| 2018/0345964 A1 | 12/2018 | Fujii et al. |
| 2018/0346027 A1 | 12/2018 | Fujii |
| 2018/0348758 A1 | 12/2018 | Nakamura et al. |
| 2018/0350242 A1 | 12/2018 | Fujii |
| 2018/0354519 A1 | 12/2018 | Miyata |
| 2018/0362013 A1 | 12/2018 | Ungermann |
| 2018/0370542 A1 | 12/2018 | Braunagel et al. |
| 2018/0370544 A1 | 12/2018 | Kitagawa |
| 2018/0373250 A1 | 12/2018 | Nakamura et al. |
| 2019/0005823 A1 | 1/2019 | Fujiki et al. |
| 2019/0026918 A1 | 1/2019 | Gomezcaballero et al. |
| 2019/0027040 A1 | 1/2019 | Ogawa et al. |
| 2019/0047469 A1 | 2/2019 | Nishiguchi et al. |
| 2019/0047561 A1 | 2/2019 | Nishiguchi et al. |
| 2019/0049958 A1 | 2/2019 | Liu et al. |
| 2019/0061766 A1 | 2/2019 | Nishiguchi |
| 2019/0071099 A1 | 3/2019 | Nishiguchi |
| 2019/0106108 A1 | 4/2019 | Wienecke et al. |
| 2019/0126923 A1 | 5/2019 | Taie et al. |
| 2019/0126927 A1* | 5/2019 | Uejima ............... B60K 28/06 |
| 2019/0135290 A1 | 5/2019 | Marden et al. |
| 2019/0155279 A1 | 5/2019 | Tayama |
| 2019/0161117 A1 | 5/2019 | Suzuki |
| 2019/0168754 A1* | 6/2019 | Makled ............... B60W 30/16 |
| 2019/0185005 A1* | 6/2019 | Fukuda ............... G08G 1/167 |
| 2019/0196481 A1 | 6/2019 | Tay et al. |
| 2019/0197497 A1 | 6/2019 | Abari et al. |
| 2019/0212443 A1 | 7/2019 | Nomura et al. |
| 2019/0235504 A1 | 8/2019 | Carter et al. |
| 2019/0241158 A1 | 8/2019 | Ghannam et al. |
| 2019/0241198 A1 | 8/2019 | Mori et al. |
| 2019/0250620 A1* | 8/2019 | Huang ............... G08G 1/0116 |
| 2019/0256064 A1 | 8/2019 | Hecker et al. |
| 2019/0263411 A1 | 8/2019 | Saikyo et al. |
| 2019/0265712 A1 | 8/2019 | Satzoda et al. |
| 2019/0279507 A1 | 9/2019 | Oshisaka et al. |
| 2019/0283757 A1 | 9/2019 | Honda et al. |
| 2019/0285726 A1 | 9/2019 | Muto |
| 2019/0291642 A1 | 9/2019 | Chae et al. |
| 2019/0291728 A1 | 9/2019 | Shalev-Shwartz et al. |
| 2019/0302763 A1 | 10/2019 | Kondo et al. |
| 2019/0302768 A1 | 10/2019 | Zhang et al. |
| 2019/0315362 A1 | 10/2019 | Um et al. |
| 2019/0317494 A1 | 10/2019 | Lee et al. |
| 2019/0325758 A1 | 10/2019 | Yoshii et al. |
| 2019/0359202 A1 | 11/2019 | Zhu et al. |
| 2019/0391580 A1 | 12/2019 | Di Cairano et al. |
| 2020/0001714 A1 | 1/2020 | Kojima |
| 2020/0049513 A1 | 2/2020 | Ma |
| 2020/0073396 A1 | 3/2020 | Shimizu |
| 2020/0172123 A1 | 6/2020 | Kubota et al. |
| 2020/0180638 A1 | 6/2020 | Kanoh |
| 2020/0189618 A1 | 6/2020 | Ochida et al. |
| 2020/0269747 A1 | 8/2020 | Kusayanagi et al. |
| 2020/0269880 A1 | 8/2020 | Tokita |
| 2020/0301431 A1 | 9/2020 | Matsubara et al. |
| 2020/0307634 A1 | 10/2020 | Yashiro |
| 2020/0312155 A1 | 10/2020 | Kelkar et al. |
| 2020/0339128 A1 | 10/2020 | Kanoh et al. |
| 2020/0391593 A1 | 12/2020 | Lee et al. |
| 2021/0188258 A1 | 6/2021 | Goto et al. |
| 2021/0188262 A1 | 6/2021 | Goto et al. |
| 2021/0188356 A1 | 6/2021 | Goto et al. |

FOREIGN PATENT DOCUMENTS

| | | |
|---|---|---|
| DE | 10 2004 005815 B3 | 6/2005 |
| DE | 10 2004 048468 A | 4/2006 |
| DE | 10 2007 005245 A | 11/2007 |
| DE | 10 2011 016 770 A1 | 11/2011 |
| DE | 10 2011 016 771 A1 | 10/2012 |
| DE | 10 2012 001405 A1 | 11/2012 |
| DE | 10 2011 109618 A1 | 2/2013 |
| DE | 10 2012 008090 A1 | 10/2013 |
| DE | 102014200896 A1 | 7/2015 |
| DE | 10 2014 225 680 A1 | 6/2016 |
| DE | 10 2015 205131 A1 | 9/2016 |
| DE | 10 2016 202946 A1 | 9/2016 |
| DE | 10 2015 206969 A1 | 10/2016 |
| DE | 10 2015 209476 A1 | 11/2016 |
| DE | 10 2015 219231 A1 | 4/2017 |
| DE | 10 2015 224244 A1 | 6/2017 |
| DE | 10 2016 007187 A1 | 6/2017 |
| DE | 10 2016 215565 A1 | 2/2018 |
| DE | 10 2016 216134 A1 | 3/2018 |
| EP | 1074904 A1 | 2/2001 |
| EP | 1607264 A1 | 12/2005 |
| EP | 2116984 A1 | 11/2009 |
| EP | 2657921 A1 | 10/2013 |
| EP | 2978648 A1 | 2/2016 |
| EP | 3075618 A2 | 10/2016 |
| EP | 3239960 A1 | 11/2017 |
| EP | 3 264 211 A1 | 1/2018 |
| EP | 3284646 A1 | 2/2018 |
| EP | 3075618 A3 | 5/2018 |
| JP | 2000-198458 A | 7/2000 |
| JP | 2003-025868 A | 1/2003 |
| JP | 2008515701 A | 5/2008 |
| JP | 2015-138330 A | 7/2015 |
| JP | 2016-000602 A | 1/2016 |
| JP | 2016011031 A | 1/2016 |
| JP | 2016-151815 A | 8/2016 |
| JP | 2016-196285 A | 11/2016 |
| JP | 2016207060 A | 12/2016 |
| JP | 2017062696 A | 3/2017 |
| JP | 2017134664 A | 8/2017 |
| JP | 2017138899 A | 8/2017 |
| JP | 2017210034 A | 11/2017 |
| JP | 2017217969 A | 12/2017 |
| JP | 2019-043169 A | 3/2019 |
| KR | 10-0578573 B2 | 5/2006 |
| KR | 20160004835 A | 1/2016 |
| KR | 20160023850 A | 3/2016 |
| KR | 10-1779823 B1 | 10/2017 |
| KR | 20180023981 A | 3/2018 |
| KR | 10-2018-0070401 A | 6/2018 |
| WO | 2010-088869 A1 | 8/2010 |
| WO | 2012-131405 A1 | 10/2012 |
| WO | 2014-154771 A1 | 10/2014 |
| WO | 2017-018133 A1 | 2/2017 |
| WO | 2017-064941 A1 | 4/2017 |
| WO | 2017-168013 A1 | 10/2017 |
| WO | 2018-033389 A1 | 2/2018 |
| WO | 2017-017793 A1 | 6/2018 |

OTHER PUBLICATIONS

Office Action dated Dec. 10, 2020 from the corresponding U.S. Appl. No. 16/269,140, 31 pp.

Office Action dated Dec. 14, 2020 from the corresponding U.S. Appl. No. 16/378,203, 49 pp.

Notice of Allowance dated Dec. 28, 2020 from the corresponding U.S. Appl. No. 16/206,170, 16 pp.

(56) References Cited

OTHER PUBLICATIONS

Office Action dated Jan. 25, 2021 from the corresponding U.S. Appl. No. 16/192,279, 38 pp.
Notice of Allowance dated Jan. 25, 2021 from the corresponding U.S. Appl. No. 16/372,937, 31 pp.
Office Action dated Jan. 27, 2021 from the corresponding U.S. Appl. No. 16/299,547, 29 pp.
Office Action dated Feb. 11, 2021 from the corresponding U.S. Appl. No. 16/372,896, 26 pp.
Office Action dated Feb. 11, 2021 from the corresponding U.S. Appl. No. 16/376,661, 24 pp.
Office Action dated Feb. 17, 2021 from the corresponding U.S. Appl. No. 16/204,324, 30 pp.
Office Action dated Feb. 17, 2021 from the corresponding U.S. Appl. No. 16/376,576, 56 pp.
Office Action dated Mar. 17, 2021 from the corresponding U.S. Appl. No. 16/378,181, 14 pp.
Notice of Allowance dated Mar. 23, 2021 from the corresponding U.S. Appl. No. 16/269,140, 9 pp.
Office Action dated Mar. 26, 2021 from the corresponding U.S. Appl. No. 16/376,612, 29 pp.
Office Action dated Apr. 15, 2021 from the corresponding U.S. Appl. No. 16/290,376, 27 pp.
Office Action dated Apr. 22, 2021 from the corresponding U.S. Appl. No. 16/378,203, 35 pp.
Notice of Allowance dated May 19, 2021 from the corresponding U.S. Appl. No. 16/204,324, 13 pp.
Office Action dated May 21, 2021 from the corresponding U.S. Appl. No. 16/372,896, 19 pp.
Notice of Allowance dated May 27, 2021 from the corresponding U.S. Appl. No. 16/376,661, 10 pp.
Office Action dated Jun. 1, 2021 from the corresponding U.S. Appl. No. 16/192,279, 39 pp.
Korean Office Action dated Jan. 30, 2019 from the corresponding Korean Application No. 10-2017-0180226, 5 pp.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
European Search Report dated Oct. 2, 2019 from the corresponding European Application No. 19163402.1, 10 pages.
European Search Report dated Oct. 2, 2019 from the corresponding European Application No. 19162795.9, 8 pages.
European Search Report dated Oct. 14, 2019 from the corresponding European Application No. 19161253.0, 11 pages.
Office Action dated Oct. 16, 2019 from corresponding U.S. Appl. No. 16/204,362, 32 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
Office Action dated Feb. 4, 2020 from the corresponding U.S. Appl. No. 16/296,890, 19 pages.
Office Action dated Mar. 25, 2020 from the corresponding U.S. Appl. No. 16/204,362, 27 pages.
European Search Report dated Mar. 27, 2020 from the corresponding European Application No. 19167264.1, 8 pages.
European Search Report dated Apr. 21, 2020 from the corresponding European Application No. 19167270.8, 8 pages.
Office Action dated Apr. 24, 2020 from the corresponding U.S. Appl. No. 16/203,884, 25 pages.
European Search Report dated May 11, 2020 from the corresponding European Application No. 19167265.8, 9 pages.
Office Action dated Jun. 1, 2020 from the corresponding U.S. Appl. No. 16/204,400, 44 pages.
Notice of Allowance dated Jul. 9, 2020 from the corresponding U.S. Appl. No. 16/204,362, 21 pages.
Office Action dated Aug. 12, 2020 from the corresponding U.S. Appl. No. 16/192,279, 60 pages.
Notice of Allowance from dated Sep. 4, 2020 from the corresponding U.S. Appl. No. 16/203,884, 15 pages.
Office Action dated Jul. 14, 2021 cited in corresponding U.S. Appl. No. 16/376,576; 43 pp.
Notice of Allowance dated Aug. 25, 2021 cited in corresponding U.S. Appl. No. 16/372,896; 5 pp.
Office Action dated Jul. 19, 2021 cited in corresponding U.S. Appl. No. 16/299,547; 14 pp.
Office Action dated Jun. 22, 2021 cited in corresponding U.S. Appl. No. 16/367,433; 15 pp.
Office Action dated Jul. 23, 2021 cited in corresponding U.S. Appl. No. 16/378,181; 14 pp.
Office Action dated Aug. 13, 2021 cited in corresponding U.S. Appl. No. 16/378,203; 24 pp.
Office Action dated Aug. 3, 2021 cited in corresponding European app No. 19167267.4; 5 pp.
Office Action dated Sep. 1, 2021 cited in corresponding U.S. Appl. No. 16/376,612; 31pp.
Office Action dated Jun. 11, 2021cited in corresponding U.S. Appl. No. 16/372,966; 7 pp.
Final Office Action dated Oct. 21, 2021 cited in corresponding U.S. Appl. No. 16/290,376; 38 pp.
Final Office Action dated Nov. 30, 2021 cited in corresponding U.S. Appl. No. 16/367,433; 17 pp.
Final Office Action dated Sep. 24, 2021 cited in corresponding U.S. Appl. No. 16/192,279; 38 pp.
Final Office Action dated Nov. 2, 2021 cited in corresponding U.S. Appl. No. 16/372,966; 10 pp.
Notice of Allowance dated Nov. 4, 2021 cited in corresponding U.S. Appl. No. 16/299,547; 6 pp.
Office Action dated Nov. 10, 2021 cited in corresponding U.S. Appl. No. 16/204,400; 29 pp.
Office Action dated Nov. 15, 2021 cited in corresponding U.S. Appl. No. 16/376,576; 36 pp.
Office Action dated Nov. 23, 2021 cited in corresponding U.S. Appl. No. 16/378,181; 21 pp.
Non Final Office Action issued in related U.S. Appl. No. 16/372,966, dated Feb. 28, 2022 (9 pages).
Non Final Office Action issued in related U.S. Appl. No. 16/367,433, dated Mar. 17, 2022 (19 pages).
Notice of Allowance issued in related U.S. Appl. No. 16/378,203, dated Feb. 14, 2022 (14 pages).
Non Final Office Action issued in related U.S. Appl. No. 16/376,612, dated Mar. 2, 2022 (26 pages).
Notice of Allowance issued in related U.S. Appl. No. 16/290,376, dated Feb. 2, 2022 (9 pages).
Notice of Allowance issued in related U.S. Appl. No. 16/290,376, dated Mar. 3, 2022 (9 pages).
Notice of Allowance issued in related U.S. Appl. No. 16/376,576, dated Apr. 6, 2022 (11 pages).
Notice of Allowance dated May 26, 2022 cited in corresponding U.S. Appl. No. 16/378,203; 10 pp.
Notice of Allowance dated Jun. 27, 2022 cited in corresponding U.S. Appl. No. 16/376,612; 11 pp.

(56) References Cited

OTHER PUBLICATIONS

Office Action cited in corresponding Korean application No. 10-2018-0093914; dated Jun. 14, 2022; 18 pp.
Office Action cited in corresponding Korean application No. 10-2018-0116231; dated Jun. 24, 2022; 16 pp.
Final Office Action issued in related U.S. Appl. No. 16/367,433 dated Jul. 15, 2022 (55 pages).
Final Office Action issued in related U.S. Appl. No. 16/204,400, dated Jul. 20, 2022 (43 pages).

* cited by examiner

APPARATUS AND METHOD FOR PROVIDING NOTIFICATION OF CONTROL AUTHORITY TRANSITION IN VEHICLE

CROSS-REFERENCE TO RELATED APPLICATION

This application is a continuation application of non-provisional U.S. patent application Ser. No. 16/296,890, filed on Mar. 8, 2019, which claims priority to and the benefit of Korean Patent Application No. 10-2018-0157006, filed on Dec. 7, 2018, which claims priority to and the benefit of U.S. Patent Application No. 62/655,831, filed on Apr. 11, 2018. The entirety of all of related applications are hereby incorporated by reference.

TECHNICAL FIELD

The present disclosure relates to an apparatus and method for providing a notification for control authority transition in an autonomous vehicle.

BACKGROUND

The statements in this section merely provide background information related to the present disclosure and may not constitute prior art.

With the development of the auto industry, an autonomous system and a driving assistance system which facilitates partially autonomous driving (hereinafter, for convenience of description, both of autonomous driving and driving assistance are referred to as "autonomous driving") have been developed. The autonomous system may provide a variety of functions, for example, setting speed keeping, vehicle-to-vehicle distance keeping, lane keeping, and a lane change. The autonomous system may perform autonomous driving using various devices such as a sensor for sensing environments outside the vehicle, a sensor for sensing information about the vehicle, a global positioning system (GPS), a detailed map, a driver state monitoring system, a steering actuator, an acceleration/deceleration actuator, a communication circuit, and a control circuit (e.g., an electronic control unit (ECU)). When a problem occurs or when the occurrence of the problem is predicted, the autonomous system may generate a notification (e.g., a transition demand (TD)) such that a driver takes over control authority of the vehicle.

The driver may fail to pay sufficient attention to driving the vehicle or may fall asleep in the vehicle loaded with the autonomous system. In such a case, the autonomous system needs to provide an effective notification such that the driver recognizes the occurrence of the problem. Furthermore, when the driver pays sufficient attention to driving the vehicle, there is a need for providing a suitable notification which is not excessive.

SUMMARY

An aspect of the present disclosure provides an apparatus and method for providing notifications suitable for various situations when providing a notification for control authority transition during autonomous control.

The technical problems to be solved by the present inventive concept are not limited to the aforementioned problems, and any other technical problems not mentioned herein will be clearly understood from the following description by those skilled in the art to which the present disclosure pertains.

In one form of the present disclosure, an apparatus for providing a notification of control authority transition in a vehicle may include: a speaker configured to output a sound notification, a vibration motor configured to output a vibration notification, and a control circuit configured to be electrically connected with the speaker and the vibration motor. The control circuit may be configured to output a first notification using the speaker during a first time interval, when a situation to hand over control authority for the vehicle occurs, output a second notification using the speaker and the vibration motor during a second time interval, after the first time interval elapses, and output a third notification using the speaker and the vibration motor during a third time interval, after the second time interval elapses.

In some forms of the present disclosure, the control circuit may be configured to hand over control authority of the vehicle to a driver of the vehicle, when an input for control authority transition is received from the driver while the first notification, the second notification, or the third notification is output.

In some forms of the present disclosure, the control circuit may be configured to control a behavior of the vehicle according to a predetermined minimum risk maneuver (MRM), when control authority of the vehicle is not handed over to a driver of the vehicle while the first notification, the second notification, and the third notification are output.

In some forms of the present disclosure, the apparatus may further include a power seat. The control circuit may be configured to adjust the power seat to a predetermined location together with outputting the third notification, when the execution of the predetermined MRM is initiated.

In some forms of the present disclosure, intensity of a sound notification included in each of the first notification, the second notification, and the third notification may be adjusted based on a speed of the vehicle.

In some forms of the present disclosure, a sound notification in the second notification may be greater in frequency than a sound notification in the first notification. A sound notification in the third notification may be greater in frequency than a sound notification in the second notification.

In some forms of the present disclosure, a vibration notification in the third notification may be greater in intensity than a vibration notification in the second notification.

In some forms of the present disclosure, the control circuit may be configured to adjust a length of at least a portion of the first time interval, the second time interval, or the third time interval based on at least a portion of a speed of the vehicle, traffic in a road where the vehicle is traveling, or lane recognizing quality, when the situation to hand over the control authority for the vehicle occurs.

In some forms of the present disclosure, the control circuit may be configured to set the first time interval, the second time interval, and the third time interval to be the same as one another, when the speed where the vehicle is traveling is less than a specified value.

In some forms of the present disclosure, the control circuit may be configured to set the second time interval and the third time interval to be longer than the first time interval, when the speed where the vehicle is traveling is greater than or equal to a specified value.

In some forms of the present disclosure, the control circuit may be configured to set the first time interval, the second time interval, and the third time interval to be the same as one another, when the traffic is less than a specified value.

In some forms of the present disclosure, the control circuit may be configured to set the second time interval and the third time interval to be longer than the first time interval, when the traffic is greater than or equal to a specified value.

In some forms of the present disclosure, the control circuit may be configured to set the third time interval to be longer than the first time interval and the second time interval, when the lane recognizing quality is less than a specified value.

In some forms of the present disclosure, the sum of the first time interval, the second time interval, and the third time interval may correspond to a predetermined value.

In some forms of the present disclosure, a method for providing a notification of control authority transition in a vehicle may include: outputting a first notification using a speaker included in the vehicle during a first time interval, when a situation to hand over control authority for the vehicle occurs, outputting a second notification using the speaker and a vibration motor included in the vehicle during a second time interval, after the first time interval elapses, and outputting a third notification using the speaker and the vibration motor during a third time interval, after the second time interval elapses.

In some forms of the present disclosure, the method may further include handing over control authority of the vehicle to a driver of the vehicle, when an input for control authority transition is received from the driver while the first notification, the second notification, or the third notification is output.

In some forms of the present disclosure, the method may further include controlling a behavior of the vehicle according to a predetermined MRM, when control authority of the vehicle is not handed over to a driver of the vehicle while the first notification, the second notification, and the third notification are output.

In some forms of the present disclosure, the method may further include adjusting a power seat included in the vehicle to a predetermined location together with outputting the third notification, when the execution of the predetermined MRM is initiated.

In some forms of the present disclosure, the method may further include adjusting a length of at least a portion of the first time interval, the second time interval, or the third time interval based on at least a portion of a speed of the vehicle, traffic in a road where the vehicle is traveling, or lane recognizing quality, when the situation to hand over the control authority for the vehicle occurs.

In some forms of the present disclosure, the sum of the first time interval, the second time interval, and the third time interval may correspond to a predetermined value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
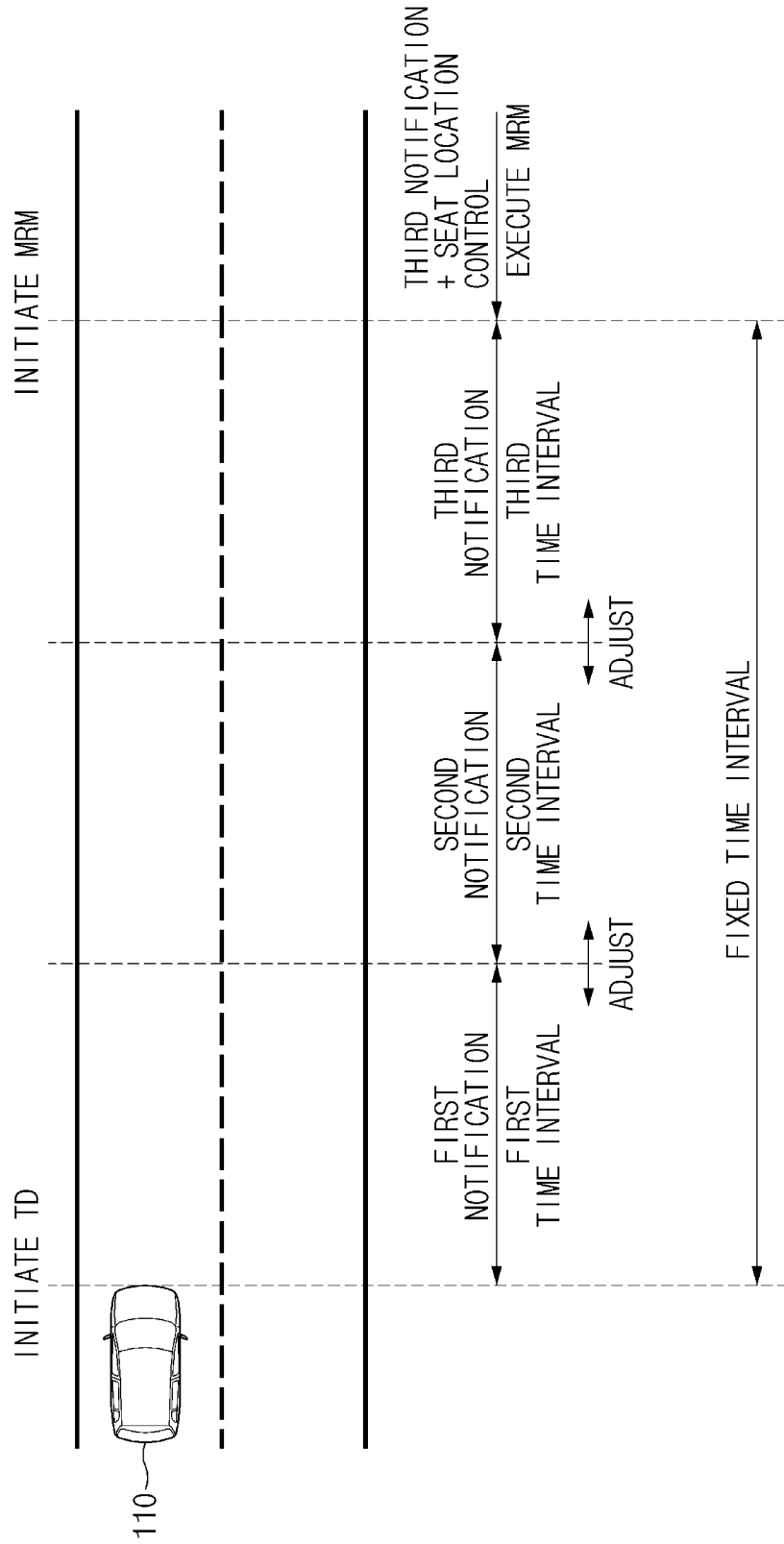
FIG. 1 is a drawing illustrating an operation environment of an apparatus for providing a notification of control authority transition in a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing some forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a drawing illustrating an operation environment of an apparatus for providing a notification of control authority transition in a vehicle in some forms of the present disclosure.

Referring to FIG. 1, a vehicle 110 in some forms of the present disclosure may generate a transition demand (TD). The vehicle 110 may provide the TD to its driver during a fixed time interval before initiating a minimum risk maneuver (MRM).

To efficiently provide the TD, the vehicle 110 may divide the entire time interval into a first time interval, a second time interval, and a third time interval. The vehicle 110 may provide a first notification during the first time interval, may provide a second notification during the second time interval, and may provide a third notification during the third time interval.

The vehicle 110 may provide a stronger notification during the second time interval than the first time interval and may provide a stronger notification during the third time interval than the second time interval. For a stronger notification, the vehicle 110 may add a means of a notification, may increase the intensity of a notification, and may increase a frequency of the notification (e.g., a sound).

A length of the first time interval, the second time interval, and the third time interval may be adjusted according to a state of the vehicle 110 and an environment around the vehicle 110. For example, when a stronger notification is required, the vehicle 110 may increase a length of the third time interval or a length of the second time interval and the third time interval.

When an MRM is initiated, the vehicle 110 may control a location of a seat of the driver concurrently with providing the third notification. By controlling the location of the seat, the vehicle 110 may reduce the impact of the driver upon collision.

Figure 2:
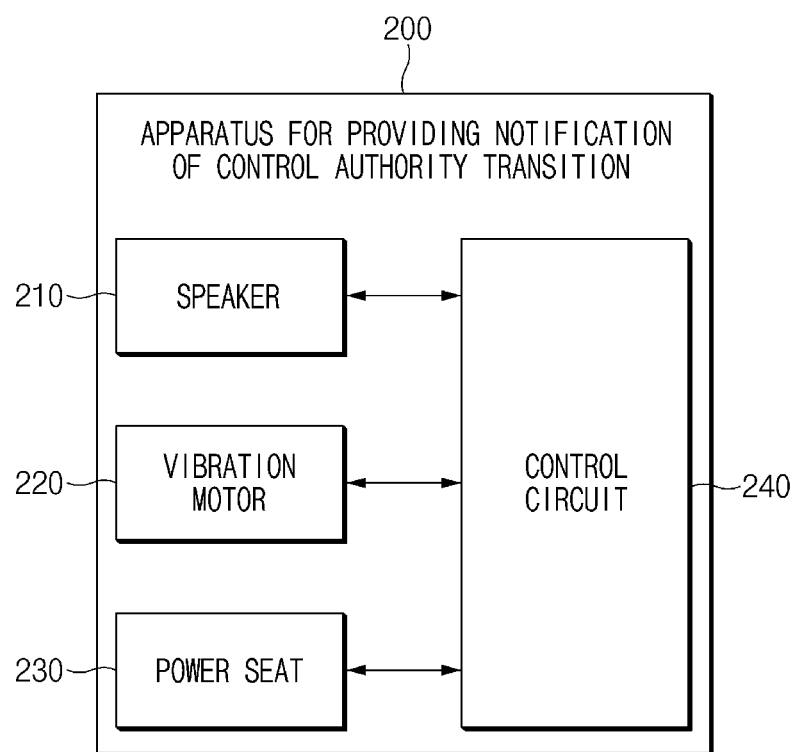
FIG. 2 is a block diagram illustrating a configuration of an apparatus for providing a notification of control authority transition in a vehicle in one form of the present disclosure.

FIG. 2 is a block diagram illustrating a configuration of an apparatus for providing a notification of control authority transition in a vehicle in some forms of the present disclosure.

Referring to FIG. 2, an apparatus 200 for providing a notification of control authority transition in some forms of the present disclosure may include a speaker 210, a vibration motor 230, a power seat 230, and a control circuit 240. The apparatus 200 for providing the notification of control authority transition in FIG. 2 may be a portion of an autonomous system and may be loaded into the vehicle.

The speaker 210 may be configured to output a sound notification. The sound notification may change in intensity, frequency, and the like in various manners. For example, the speaker 210 may be installed in the vehicle and may provide a sound notification to a driver of the vehicle.

The vibration motor 220 may be configured to output a vibration notification. The vibration notification may change in intensity, frequency, and the like in various manners. The vibration motor 220 may be connected with a seat belt in the vehicle and may provide a vibration notification to the driver by means of the seat belt. For example, the seat belt may be connected to a rotary shaft of the vibration motor 220, and the rotation of the rotary shaft of the vibration motor 220 may make the seat belt vibrate.

The power seat 230 may be moved by an electrical signal. The power seat 230 may be moved by movement of a motor included in the power seat 230. For example, the power seat 230 may change in location and height, and a backrest and a headrest, included in the power seat 230, may change in location and angle.

The control circuit 240 may be electrically connected with the speaker 210, the vibration motor 220, and the power seat 230. The control circuit 240 may control the speaker 210, the vibration motor 220, and the power seat 230 and may perform a variety of data processing and various arithmetic operations. The control circuit 240 may be, for example, an electronic control unit (ECU), a micro controller unit (MCU), or a sub-controller, which is loaded into the vehicle.

In some forms of the present disclosure, the control circuit 240 may detect a situation to hand over control authority (also known as transferring control) for the vehicle. The situation to hand over control authority may include, for example, a failure of an autonomous system, detection of risk due to an external object, departure from an operational design domain (ODD) of the autonomous system (e.g., a limited-access road), or the like. The control circuit 240 may detect the situation to hand over control authority, using system information, sensor information, map information, and the like.

In some forms of the present disclosure, when the situation to hand over control authority occurs, the control circuit 240 may output a notification for control authority transition during a predetermined time interval. The entire time for outputting the notification may be a fixed time. When the predetermined time interval elapses, the control circuit 240 may initiate execution of a minimum risk maneuver (MRM). For efficiency of the notification, the output of the notification may be subdivided as below.

In some forms of the present disclosure, when the situation to hand over control authority occurs, the control circuit 240 may output a first notification using the speaker 210 during a first time interval. The first notification may include, for example, a sound notification. The intensity of the sound notification may be adjusted based on a speed of the vehicle. For example, the faster the speed of vehicle, the stronger the intensity of the sound notification may be. The control circuit 240 may maintain the first notification during the first time interval.

In some forms of the present disclosure, after the first time interval elapses, the control circuit 240 may output a second notification using the speaker 210 and the vibration motor 220 during a second time interval. The second notification may include, for example, a sound notification and a vibration notification. The control circuit 240 may provide the second notification stronger than the first notification. For example, the second notification may include a tactile notification together with an audible notification. For another example, the sound notification of the second notification is greater in frequency than that of the first notification. For another example, the sound notification of the second notification may be greater than that of the first notification.

In some forms of the present disclosure, after the second time interval elapses, the control circuit 240 may output a third notification using the speaker 210 and the vibration motor 220 during a third time interval. The third notification may include, for example, a sound notification and a vibration notification. The control circuit 240 may provide the third notification stronger than the first notification and the second notification. For example, the third notification may include a tactile notification together with an audible notification. For another example, the sound notification of the third notification may be greater in frequency than that of the second notification. For another example, the sound notification of the third notification may be greater in intensity than that of the second notification. For another example, the vibration notification of the third notification may be greater in intensity than that of the second notification.

As described above, the control circuit 240 may increase the efficiency of the notification by providing the notification for control authority transition step by step.

In some forms of the present disclosure, when there occurs the situation to hand over control authority for the vehicle, the control circuit 240 may adjust a length of at least a portion of the first time interval, the second time interval, or the third time interval based on at least a portion of a speed where the vehicle is traveling, traffic in a road where the vehicle is traveling, or quality where the vehicle recognizes a lane. The control circuit 240 may recognize the speed where the vehicle is traveling. The control circuit 240 may recognize the traffic in the road where the vehicle is traveling, by detecting vehicles outside the vehicle. The control circuit 240 may recognize lane recognition quality depending on a lane recognition state by a camera of the vehicle (e.g., a value indicating whether a lane is recognized or a value in which a lane recognition state is scored). The control circuit 240 may adjust a length of at least a portion of the first time interval, the second time interval, or the third time interval based on the obtained information. Although the length of the time interval is adjusted, the sum of the first time interval, the second time interval, and the third time interval, that is, a time interval from a time when the notification occurs to a time when the MRM is executed, may be maintained to correspond to a predetermined value.

In some forms of the present disclosure, when the speed where the vehicle is traveling is less than a specified value, the control circuit 240 may set the first time interval, the second time interval, and the third time interval to be identical to one another. When the speed where the vehicle is traveling is greater than or equal to the specified value, the control circuit 240 may set the second time interval and the third time interval to be longer than the first time interval. When the speed where the vehicle is traveling is greater than or equal to the specified value, since risk of the vehicle is high, the control circuit 240 may increase a length of the second time interval and the third time interval.

In some forms of the present disclosure, when the traffic is less than a specified value, the control circuit 240 may set the first time interval, the second time interval, and the third time interval to be identical to one another. In some forms of the present disclosure, when the traffic is greater than or equal to the specified value, the control circuit 240 may set the second time interval and the third time interval to be longer than the first time interval. When the traffic is greater than or equal to the specified value, since risk of the vehicle is high, the control circuit 240 may increase a length of the second time interval and the third time interval.

In some forms of the present disclosure, when the lane recognition quality is lower than a specified value, the control circuit 240 may set the third time interval to be longer than the first time interval and the second time interval. When the lane recognition quality is lower than the specified value, since risk of the vehicle is greatly increased, the control circuit 240 may significantly increase a length of the third time interval.

In some forms of the present disclosure, when an input for control authority transition is received from a driver of the vehicle while the first notification, the second notification, or the third notification is output, the control circuit 240 may hand over control authority of the vehicle to the driver.

In some forms of the present disclosure, when the control authority of the vehicle is not handed over to the driver of the vehicle while the first notification, the second notification, and the third notification are output, the control circuit 240 may control a behavior of the vehicle according to a predetermined MRM. When the execution of the predetermined MRM is initiated, the control circuit 240 may adjust the power seat 230 to a predetermined location together with outputting the third notification. To reduce an impact on the driver when a collision occurs, the control circuit 240 may adjust a location and height of the power seat 230, for example, a location and angle of a backrest of the power seat 230, a location and angle of a headrest of the power seat 230, or the like.

Figure 3:
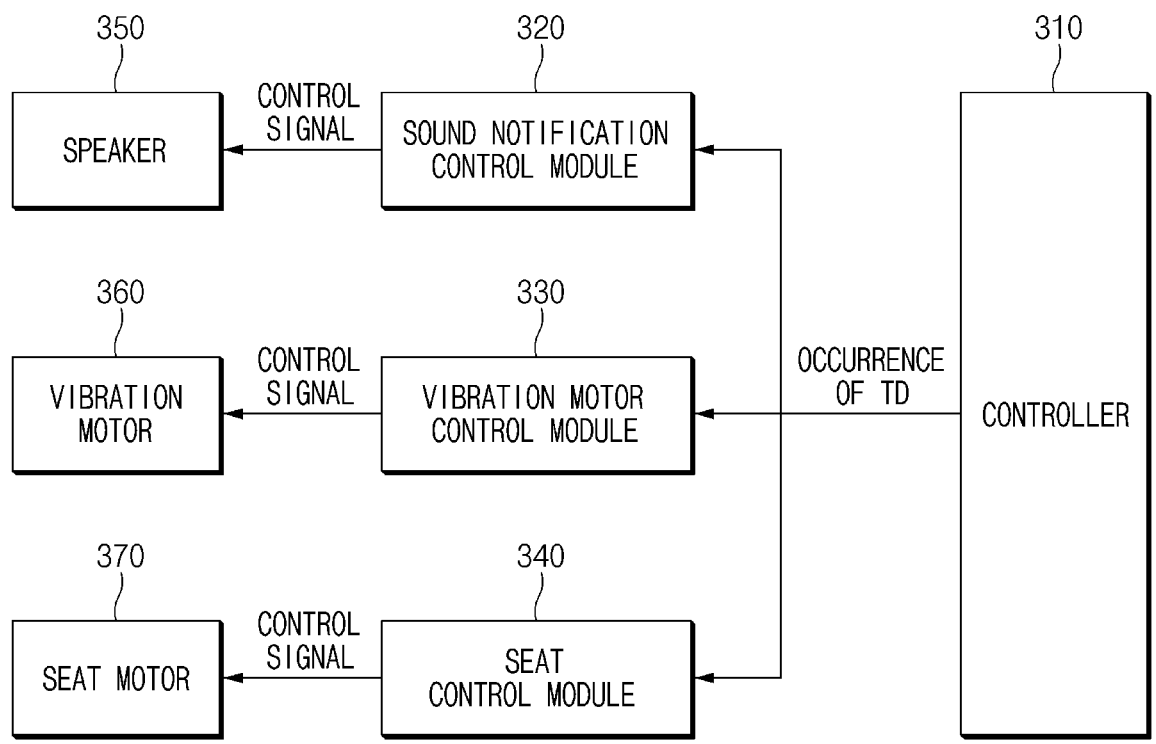
FIG. 3 is a block diagram illustrating a configuration of an apparatus for providing a notification of control authority transition in a vehicle in one form of the present disclosure.

FIG. 3 is a block diagram illustrating a configuration of an apparatus for providing a notification of control authority transition in a vehicle in some forms of the present disclosure.

Referring to FIG. 3, the apparatus in some forms of the present disclosure may include a controller 310, a sound notification control module 320, a vibration motor control module 330, a seat control module 340, a speaker 350, a vibration motor 360, and a seat motor 370.

The controller 310 may determine a situation to hand over control authority to a driver of the vehicle while autonomous driving is performed and a time to provide a transition demand (TD). The controller 310 may deliver a control signal for providing a TD to the sound notification control module 320, the vibration motor control module 330, and the seat control module 340 until the control authority is handed over to the driver.

The sound notification control module 320 may deliver a control signal to the speaker 350 and may generate a sound notification using the speaker 350. The sound notification control module 320 may control intensity, a frequency, and the like of the sound notification.

The vibration motor control module 330 may deliver a control signal to the vibration motor 360 and may generate a vibration notification using the vibration motor 360. The vibration motor control module 330 may control intensity, a pattern, frequency, and the like of the vibration notification.

The seat control module 340 may deliver a control signal to the seat motor 370 and may adjust a location of a seat using the seat motor 370. The seat control module 340 may control the seat motor 370 to move the seat to a previously stored location.

The controller 310, the sound notification control module 320, the vibration motor control module 330, and the seat control module 340 may be implemented in a divided form as shown in FIG. 3 or may be implemented in an integrated form.

Figure 4:
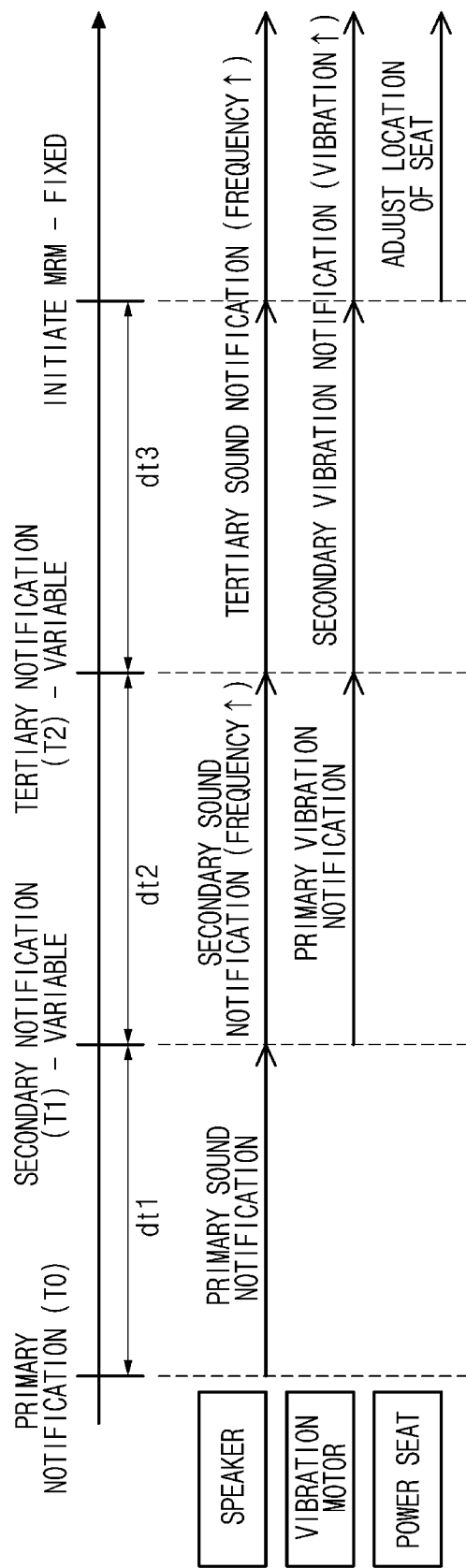
FIG. 4 is a drawing illustrating an exemplary operation of an apparatus for providing a notification of control authority transition in a vehicle in one form of the present disclosure.

FIG. 4 is a drawing illustrating an exemplary operation of an apparatus for providing a notification of control authority transition in a vehicle in some forms of the present disclosure.

Referring to FIG. 4, the vehicle in some forms of the present disclosure may provide a primary sound notification using its speaker during a first time interval dt1 from a primary notification time t0. The vehicle may provide a secondary sound notification using the speaker during a second time interval dt2 from a secondary notification time t1 and may provide a primary vibration notification using its vibration motor. The second sound notification may be higher in frequency than the first sound notification. The vehicle may provide a tertiary sound notification using the speaker during a third time interval dt3 from a tertiary notification time t2 and may provide a secondary vibration notification using the vibration motor. The tertiary sound notification may be higher in frequency than the secondary sound notification. The secondary vibration notification may be higher in intensity than the primary vibration notification. When an MRM is initiated, the vehicle may adjust a location of its seat together with providing the tertiary sound notification and the secondary vibration notification. The seat may move to a predetermined location capable of reducing impact of a driver of the vehicle.

The vehicle may perform inverse calculation with respect to a time when the MRM is initiated to calculate the primary notification time t0, the secondary notification time t1, and the tertiary notification time t2. The primary notification time t0 may be fixed, and the second notification time t1 and the tertiary notification time t2 may vary with a situation. For example, when a speed of the vehicle is low and when traffic is low, the first time interval dt1, the second time interval dt2, and the third time interval dt3 may be set to be the same as one another. For another example, when the speed of the vehicle is high and when the traffic is high, the second time interval dt2 and the third time interval dt3 may be set to be longer than the first time interval dt1. For another example, when lane recognition quality is low irrespective of the speed of the vehicle and the traffic, the third time interval dt3 may be set to be longer than the first time interval dt1 and the second time interval dt2.

Figure 5:
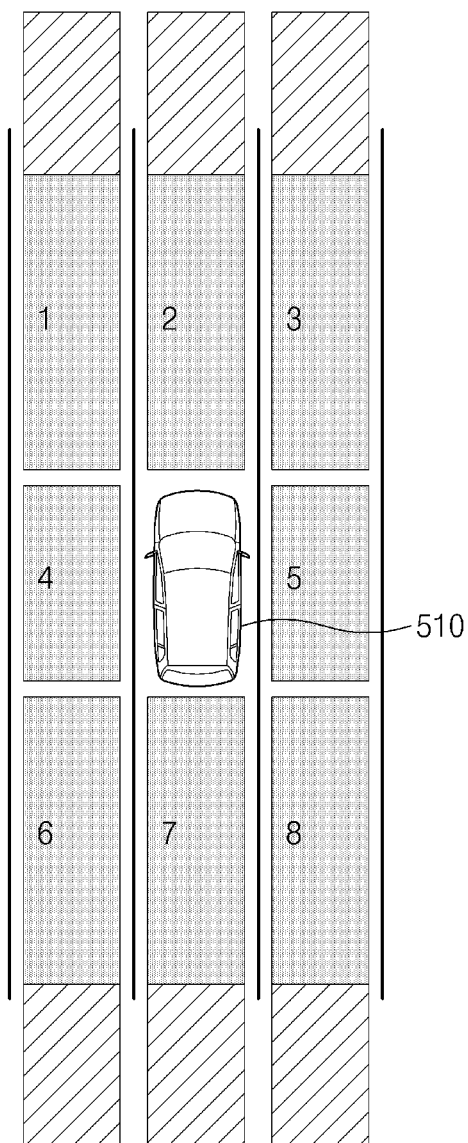
FIG. 5 is a drawing illustrating an exemplary operation of an apparatus for providing a notification of control authority transition in a vehicle in one form of the present disclosure.

FIG. 5 is a drawing illustrating an exemplary operation of an apparatus for providing a notification of control authority transition in a vehicle in some forms of the present disclosure.

Referring to FIG. 5, the vehicle in some forms of the present disclosure may divide an area around the vehicle into 8 areas. A length of each of the 8 areas may be proportional to a speed of the vehicle. The vehicle may set the nearest vehicle among vehicles included in each of the 8 areas as a target vehicle. For example, the vehicle may set the nearest vehicle among vehicles included in a $1^{st}$ area 1 and the nearest vehicle among vehicles included in a $2^{nd}$ area 2 as target vehicles. The vehicle may obtain a distance between the vehicle and the target vehicle. When there is no target vehicle, a distance may be set to "0". The vehicle may calculate traffic using (e.g. adding up) a value obtained by multiplying a reciprocal of the distance by a rate factor corresponding to a corresponding area. The magnitude of the rate factor may be set, for example, the $2^{nd}$ area>the $1^{st}$ area=a $3^{rd}$ area>a $4^{th}$ area=a $5^{th}$ area>a $7^{th}$ area>a $6^{th}$ area=an $8^{th}$ area.

Figure 6:
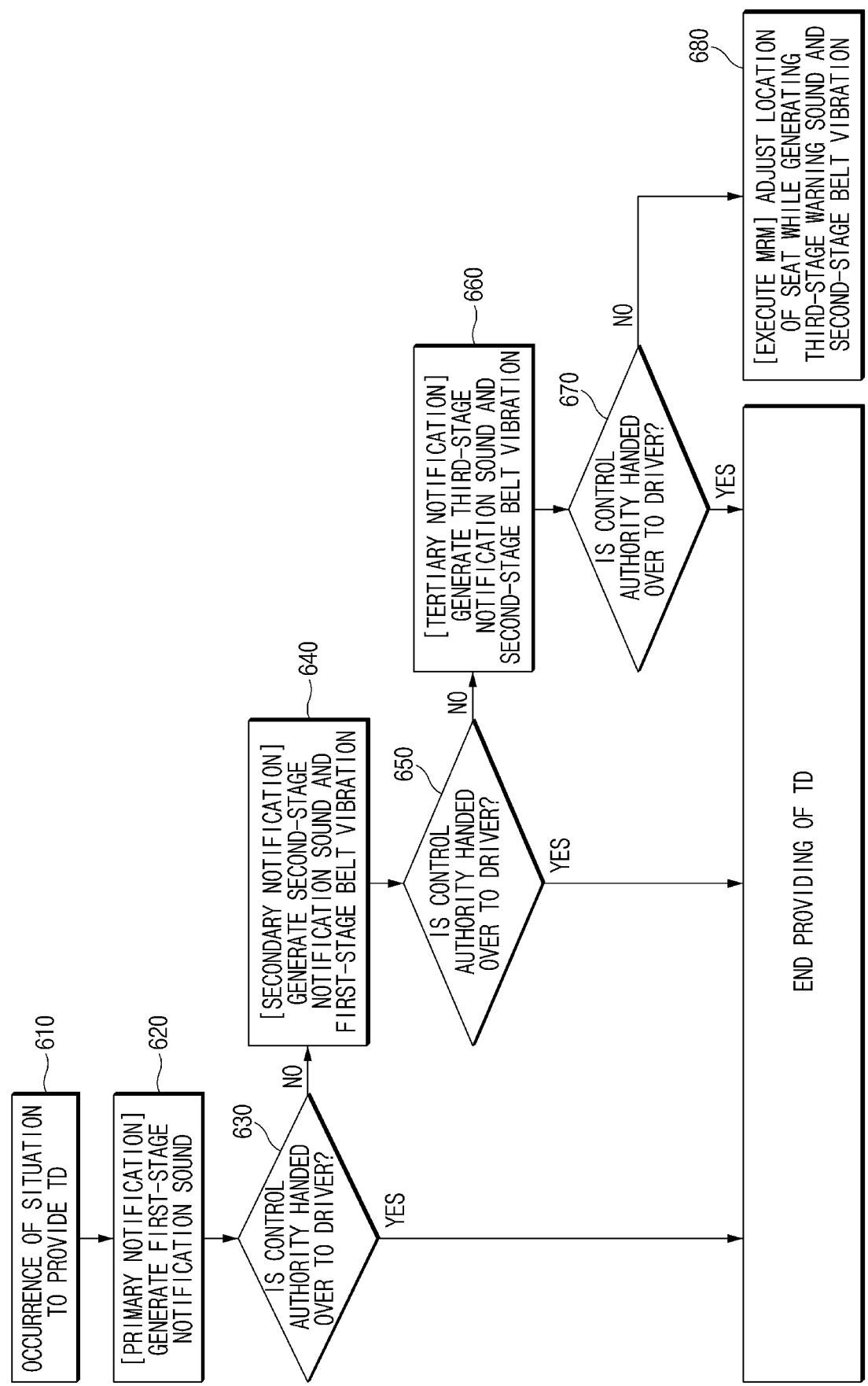
FIG. 6 is a flowchart illustrating a method for providing a notification of control authority transition in a vehicle in one form of the present disclosure.

FIG. 6 is a flowchart illustrating a method for providing a notification of control authority transition in a vehicle in some forms of the present disclosure.

Hereinafter, it is assumed that a vehicle including an apparatus 200 for providing a notification of control authority transition in FIG. 2 performs a process of FIG. 6. In a description of FIG. 6, an operation described as being performed by the vehicle may be understood as being controlled by a control circuit 240 of the apparatus 200 for providing the notification of control authority transition.

Referring to FIG. 6, in operation 610, the vehicle may recognize occurrence of a situation to provide a TD. In operation 620, the vehicle may generate a first-stage notification sound as a primary notification. In operation 630, while generating the primary notification, the vehicle may determine whether control authority is handed over to its driver. When the control authority is handed over to the driver, the vehicle may end the providing of the TD. When the control authority is not handed over to the driver, in operation 640, the vehicle may generate a second-stage notification sound and first-stage belt vibration as a secondary notification. In operation 650, while generating the second notification, the vehicle may determine whether the control authority is handed over to the driver. When the control authority is handed over to the driver, the vehicle may end the providing of the TD. When the control authority is not handed over to the driver, in operation 660, the vehicle may generate a third-stage notification sound and second-stage belt vibration as a tertiary notification. In operation 670, while generating the third notification, the vehicle may determine whether the control authority is handed over to the driver. When the control authority is handed over to the driver, the vehicle may end the providing of the TD. When the control authority is not handed over to the driver, in operation 680, the vehicle may execute an MRM. The vehicle may adjust a location of a seat while generating a third-stage warning sound and the second-stage belt vibration.

Figure 7:
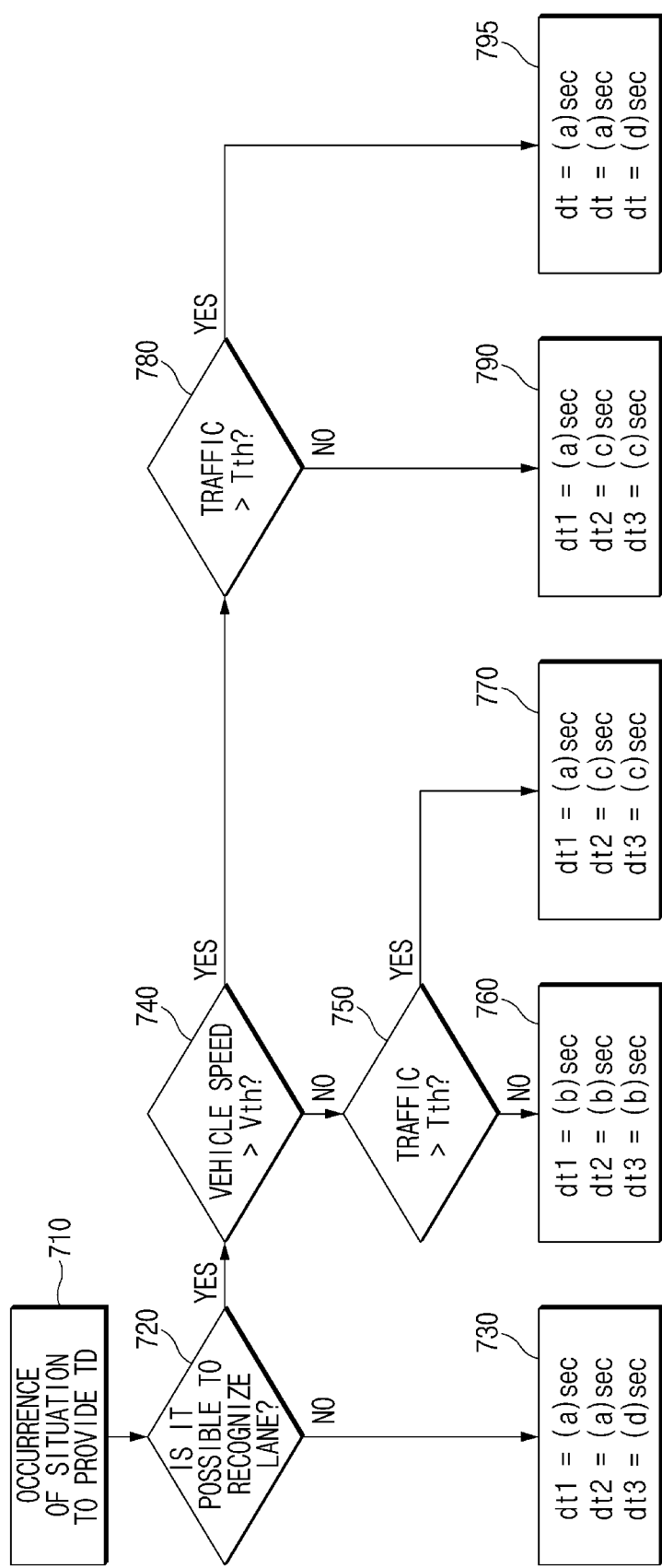
FIG. 7 is a flowchart illustrating a method for providing a notification of control authority transition in a vehicle in one form of the present disclosure.

FIG. 7 is a flowchart illustrating a method for providing a notification of control authority transition in a vehicle in some forms of the present disclosure.

Hereinafter, it is assumed that a vehicle including an apparatus 200 for providing a notification of control authority transition in FIG. 2 performs a process of FIG. 7. In a description of FIG. 7, an operation described as being performed by the vehicle may be understood as being controlled by a control circuit 240 of the apparatus 200 for providing the notification of control authority transition.

Referring to FIG. 7, in operation 710, the vehicle may recognize occurrence of a situation to provide a TD. In operation 720, the vehicle may determine whether it is possible to recognize a lane. When it is impossible to recognize the lane, in operation 730, the vehicle may set a first time interval dt1 and a second time interval dt2 to (a) seconds and may set a third time interval dt3 to (d) seconds. Herein, (d) may be greater than (c), (c) may be greater than (b), and (b) may be greater than (a). When the sum of (a) to (d) may be kept constant. When it is possible to recognize the lane, in operation 740, the vehicle may determine whether a speed of the vehicle is greater than a specified speed Vth. When the speed of the vehicle is less than or equal to the specified speed Vth, in operation 750, the vehicle may determine whether traffic is greater than a specified value Tth. When the traffic is less than or equal to the specified value Tth, in operation 760, the vehicle may set the first time interval dt1, the second time interval dt2, and the third time interval dt2 to (b) seconds. When the traffic is greater than the specified value Tth, in operation 770, the vehicle may set the first time interval dt1 to (a) seconds and may set the second time interval dt2 and the third time interval dt3 to (c) seconds. When the speed of the vehicle is greater than the specified speed Vth, in operation 780, the vehicle may determine whether the traffic is greater than the specified value Tth. When the traffic is less than or equal to the specified value Tth, in operation 790, the vehicle may set the first time interval dt1 to (a) seconds and may set the second time interval dt2 and the third time interval dt3 to (c) seconds. When the traffic is greater than the specified value Tth, in operation 795, the vehicle may set the first time interval dt1 and the second time interval dt2 to (a) seconds and may set the third time interval dt3 to (d) seconds.

Figure 8:
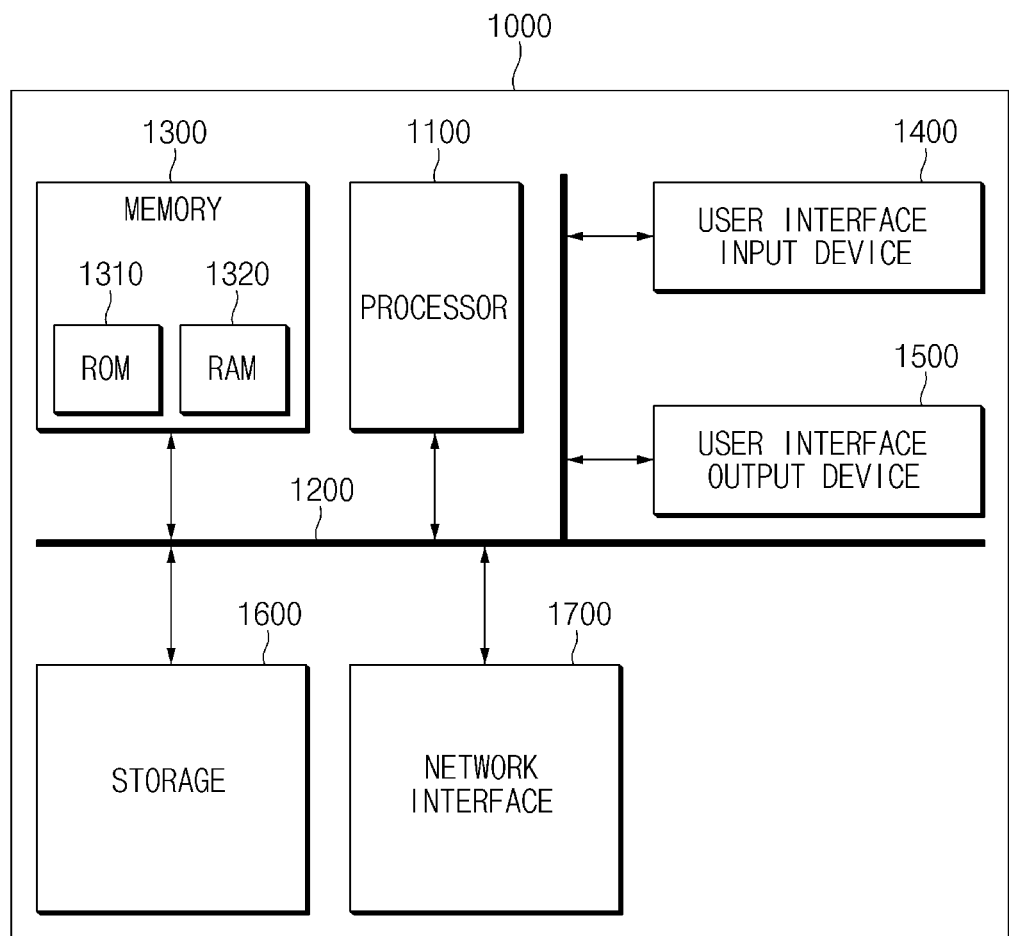
FIG. 8 is a block diagram illustrating a configuration of a computing system in one form of the present disclosure.

FIG. 8 is a block diagram illustrating a configuration of a computing system in some forms of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for performing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in some forms of the present disclosure may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus for providing the notification of control authority transition in the vehicle in some forms of the present disclosure may increase the efficiency of the notification by providing various notifications step by step to the driver and adjusting a time interval for changing a notification stage.

In addition, various effects directly or indirectly ascertained through the present disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for providing a notification of control authority transition in a vehicle, the apparatus comprising:
    a speaker configured to output a sound notification;
    a vibration motor configured to output a vibration notification; and
    a control circuit electrically connected to the speaker and the vibration motor and configured to:
        output a first notification using the speaker during a first time interval when a situation to hand over control authority for the vehicle occurs;
        output a second notification using the speaker and the vibration motor during a second time interval after the first time interval elapses under the situation;
        output a third notification using the speaker and the vibration motor during a third time interval after the second time interval elapses under the situation; and
        adjust a length of at least a portion of the first time interval, the second time interval, or the third time interval based on at least one of a speed of the vehicle, traffic in a road where the vehicle is traveling, or a lane recognizing quality value when the control authority of the vehicle is transferred.

2. The apparatus of claim 1, wherein the control circuit is configured to:
    transfer the control authority of the vehicle to a driver of the vehicle when an input for the control authority transition is received from the driver during an output of the first notification, the second notification, or the third notification.

3. The apparatus of claim 1, wherein the control circuit is configured to:
    control a behavior of the vehicle corresponding to a predetermined minimum risk maneuver (MRM) when the control authority of the vehicle is not transferred to a driver of the vehicle during the output of the first notification, the second notification, and the third notification.

4. The apparatus of claim 3, wherein the apparatus further comprises:
    a power seat,
    wherein the control circuit is configured to:
        adjust the power seat to a predetermined location with the output of the third notification when the predetermined MRM is initiated.

5. The apparatus of claim 1, wherein an intensity of the sound notification included in each of the first notification, the second notification, and the third notification is adjusted based on a speed of the vehicle.

6. The apparatus of claim 1, wherein:
    the sound notification in the second notification is greater in frequency than the sound notification in the first notification; and
    the sound notification in the third notification is greater in frequency than the sound notification in the second notification.

7. The apparatus of claim 1, wherein the vibration notification in the third notification is greater in intensity than the vibration notification in the second notification.

8. The apparatus of claim 1, wherein the control circuit is configured to:
    set the first time interval, the second time interval, and the third time interval to be the same as one another when the speed of the vehicle is less than a first predetermined value.

9. The apparatus of claim 1, wherein the control circuit is configured to:
    set the second time interval and the third time interval to be longer than the first time interval when the speed of the vehicle is greater than or equal to a first predetermined value.

10. The apparatus of claim 1, wherein the control circuit is configured to:
    set the first time interval, the second time interval, and the third time interval to be the same as the one another when the traffic is lower than a second predetermined value.

11. The apparatus of claim 1, wherein the control circuit is configured to:
    set the second time interval and the third time interval to be longer than the first time interval when the traffic is higher than or equal to a second predetermined value.

12. The apparatus of claim 1, wherein the control circuit is configured to:
    set the third time interval to be longer than the first time interval and the second time interval when the lane recognizing quality value is less than a third predetermined value.

13. The apparatus of claim 1, wherein a sum of the first time interval, the second time interval, and the third time interval corresponds to a fourth predetermined value.

14. A method for providing a notification of control authority transition in a vehicle, the method comprising:
    outputting, by a speaker, a first notification during a first time interval when a situation to hand over control authority for the vehicle occurs;
    outputting, by the speaker and a vibration motor, a second notification during a second time interval after the first time interval elapses under the situation; and
    outputting, by the speaker and the vibration motor, a third notification during a third time interval after the second time interval elapses under the situation,
    wherein a length of at least a portion of the first time interval, the second time interval, or the third time interval is adjusted by a control circuit based on at least one of a speed of the vehicle, traffic in a road where the vehicle is traveling, or a lane recognizing quality value when the control authority of the vehicle is transferred.

15. The method of claim 14, wherein the method further comprises:
    transferring, by a control circuit, the control authority of the vehicle to a driver of the vehicle when an input for the control authority transition is received from the driver during an output of the first notification, the second notification, or the third notification.

16. The method of claim 14, wherein the method further comprises:

controlling, by the control circuit, a behavior of the vehicle corresponding to a predetermined minimum risk maneuver (MRM) when the control authority of the vehicle is not transferred to a driver of the vehicle during the output of the first notification, the second notification, and the third notification.

17. The method of claim 16, wherein the method further comprises:

adjusting, by the control circuit, a power seat included in the vehicle to a predetermined location with the output of the third notification when the predetermined MRM is initiated.

18. The method of claim 14, wherein a sum of the first time interval, the second time interval, and the third time interval corresponds to a predetermined value.

\* \* \* \* \*